Oct. 19, 1971 S. J. MacARTHUR 3,613,214

APPARATUS FOR MOUNTING A HEAD/ARM ASSEMBLY

Filed Jan. 16, 1970

INVENTOR.
STEVEN J. MACARTHUR
BY
Robert B. Crouch

United States Patent Office 3,613,214
Patented Oct. 19, 1971

3,613,214
APPARATUS FOR MOUNTING A HEAD/ARM ASSEMBLY

Steven J. MacArthur, San Jose, Calif., assignor to Information Storage Systems, Inc., Cupertino, Calif.

Filed Jan. 16, 1970, Ser. No. 3,321
Int. Cl. B23p *19/00*
U.S. Cl. 29—200 P 3 Claims

ABSTRACT OF THE DISCLOSURE

Apparatus for mounting a head/arm assembly in a disk storage drive including a flange on the assembly, a tool for cooperation with a portion of the flange, means for converting rotary motion of the tool into axial movement of the assembly and means for clamping the flange to secure the assembly in a selected position.

BACKGROUND

The conventional disk storage drive utilizes a removable disk, or disk stack, as the storage medium for magnetically recorded data. The removable media makes precise alignment of the read/write heads imperative as the media is intended to be interchangeable between drives. Since data recorded on one drive must be capable of being read and/or updated on any other drive of the same type, the individual read/write heads in each drive must be precisely aligned to a standard which is common to all drives. In the conventional drive a separate read/write head is provided for cooperation with each disk surface that is intended to receive data. In the normal case this results in either ten or twenty read/write heads, each of which must be individually aligned to permit interchangeability of the disks. Each read/write head is gimballed on one end of a planar arm, the opposite end of which is secured to a T block which is mounted on a movable carriage for movement radially of the rotating disk. The fixed end of each arm is received in slots in the T block to position the arm in a horizontal plane. The arms are then clamped against a machined surface on the T block in pairs to position them in a vertical plane. To align the arms the extremity of each is seated against an adjustable stop in the form of a set screw which is threaded into the T block. This arrangement is cumbersome since it does not permit adjustment of an individual head/arm assembly without disturbing the setting of the adjacent assembly. In addition, the use of a stop provides only unidirectional adjustment since movement of the set screw is transmitted to the arm only in one direction.

INVENTION

The present invention avoids the shortcomings of the prior known devices by provision of apparatus for mounting a head/arm assembly in a disk storage drive which permits simplified positive adjustment of each assembly individually. This is accomplished by provision of a head/arm assembly having a flange intended to bear against a vertical surface on a mounting block. A hand tool is provided which is adapted to be received within an opening in the flange such that rotary motion of the hand tool is converted into axial movement of the assembly and means is provided for clamping the flange against the mounting block.

Other objects and many of the attendant advantages of this invention will be readily appreciated as the same becomes better understood by reference to the following detailed description when considered in connection with the accompanying drawing wherein.

Figures 1, 2:
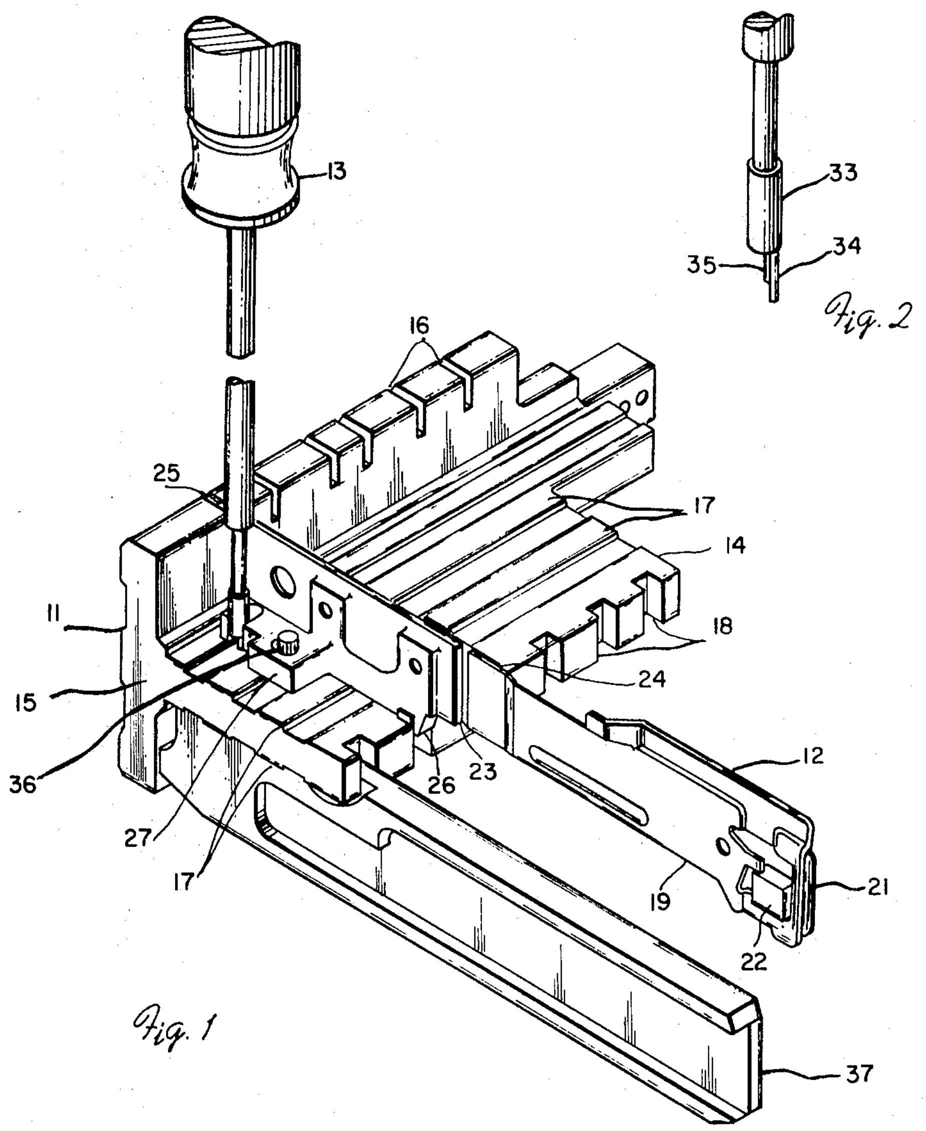
FIG. 1 is perspective view of a head/arm assembly supported on a T block with a hand tool positioned to adjust the assembly.
FIG. 2 is a perspective view of a portion of the tool of FIG. 1.

Referring to FIG. 1 of the drawing a mounting for a head/arm assembly according to the present invention is illustrated as including a T block 11, a head/arm assembly 12 supported on the T block and a hand tool 13 positioned to adjust the location of the head/arm assembly relative to the T block. The T block is a machined casting which includes a longitudinal web 14 and a cross member 15 formed integrally therewith and extending in opposite directions along one edge of the web. The opposite edges of the cross member are provided with spaced slots 16 as indicated. The opposite side surface of the web are provided with a plurality of spaced ribs 17 extending generally parallel to the cross member. The ribs are machined to provide a smooth planar surface on each side of the web. The web is also provided with a plurality of spaced slots 18 extending inwardly from the free edge and between the side surfaces. The head/arm assembly includes a head support section 19, at the distal end of which is gimballed a gliding shoe 21. A read/write head 22 is mounted in the gliding shoe for cooperation with one surface of a rotating disk. The section 19 is connected to a mounting section 23 by means of a flexible spring section 24. The mounting section includes a longitudinally extending projection 25 at the extremity removed from the flexible section 24 and a laterally extending projection 26 adjacent section 24. A flange 27 is provided intermediate the projections 25 and 26 extending normal to the longitudinal axis of the mounting section and parallel with the web of the T block.

Figure 3:
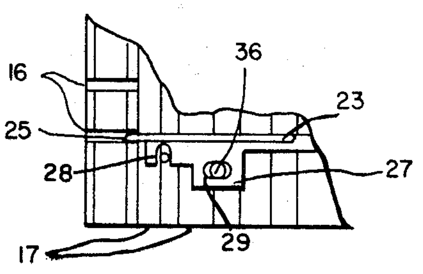
FIG. 3 is a fragmentary plan view showing the flange section of the head/arm assembly positioned on the T block of FIG. 1.

As shown in FIG. 3 the flange 27 is provided with a pair of elongated openings 28 and 29. The major axes of which are normal to each other. Opening 28 is illustrated as a slot extending inwardly from the free edge of the flange and approximately at right angles to the longitudinal axis of the head/arm assembly. Opening 29 extends approximately at right angles to opening 28 and generally parallel to the longitudinal axis of the head/arm assembly. A pair of openings are provided in the web of the T block in general alignment with the opening in each flange. The hand tool 13 is provided with a generally circular cam section 33, an eccentric projection 34 of a diameter which is but a fraction of that of the cam and an intermediate section 35 joining the cam and the eccentric projection.

In the operation of the present invention a head/arm assembly is positioned on the web of the T block in the manner shown in FIG. 1. The assembly is held in a first plane by means of the longitudinal projection 25 received in one of the slots 16 in the cross member and the lateral projection 26 received in a corresponding slot 18 of the web. The assembly is located in a second plane by means of the flange bearing against the machined surfaces of the ribs 17. The assembly is free to move toward or away from the cross member in the first plane, since the projections will slide in the slots. To clamp the assembly in a desired position a screw 36 is inserted in opening 29 and received in the corresponding web opening which is internally threaded. The plurality of head/arm assemblies can thus be positioned one at a time on the opposite surfaces of the web of the T block adjacent the head loading pad 37. The hand tool is then employed to accurately position each head/arm assembly and bring the individual heads into final alignment. This is accomplished by insertion of the eccentric projection 34 through opening 28 in each flange and into the corresponding opening in the web. When the hand tool is inserted, the cam 33 is positioned within the opening 28 of the flange. Upon rotation of the hand tool, the eccentric projection 34 acts as the center of rotation and cam 33 rotates thereabout in an eccentric manner. Since opening 28 is sized to the cam, the flange, and thus the head/arm assembly, will follow the eccentric movement of the cam, so that rotational motion of the hand tool is converted into axial movement of the head/arm assembly. By this means a head/arm assembly can be adjusted in both directions i.e. toward and away from the cross member 15 simply by rotation of the hand tool in order to bring each individual head into alignment with the rest of the heads. When the head/arm assembly is in the desired position the screw 36 is tightened to clamp the flange against the ribs and secure the entire head/arm assembly firmly in that position. The intermediate section 35 serves as a stop for insertion of the hand tool. Since the opening of the web are located in the recesses between adjacent ribs, the intermediate section spaces the cam above the edges of the ribs to permit unrestrained rotational movement of the hand tool.

Obviously many modifications and variations of the present invention are possible in the light of the above teachings. Therefore, to be understood within the scope of the appended claims, the invention may be practiced otherwise and as specifically described.

What is claimed is:

1. Apparatus for mounting and assembling a head/arm assembly on a T block having a machined surface in a disk storage drive which permits individual adjustment of a selected assembly without effecting the setting of an adjacent assembly comprising:

a flange on the head/arm assembly intermediate its ends extending approximately normal to the longitudinal axis of the assembly and adapted to bear against the machined surface on the T block;

means for clamping said flange against the machined surface in a selected position of longitudinal adjustment; and means including an elongated slot on the flange for reception of a rotary hand tool and for converting the rotary motion of the hand tool into axial movement of the head/arm assembly.

2. Apparatus for mounting a head/arm assembly as set forth in claim 1, wherein: the elongated slot means is in the flange extending generally at right angles to the longitudinal axis of the head/arm assembly.

3. Apparatus for mounting a head/arm assembly as set forth in claim 2 in combination with a hand tool for adjusting the position of the assembly on the T block, the hand tool including:

a projection for engaging the T block to provide a pivot point for the tool; and a cylindrical cam on the tool dimensioned to be received within the slot, the central axis of the cam being eccentric to the projection.

References Cited

UNITED STATES PATENTS

| | | | |
|---|---|---|---|
| 2,514,099 | 7/1950 | Soderman | 29—200 P |
| 3,460,226 | 8/1969 | Hildebrand | 29—200 P |
| 3,469,299 | 9/1969 | Rogers | 29—200 P |

THOMAS H. EAGER, Primary Examiner